A. T. SISSON.
FORMING MACHINE.
APPLICATION FILED JAN. 5, 1906.

911,911.

Patented Feb. 9, 1909.
14 SHEETS—SHEET 2.

A. T. SISSON.
FORMING MACHINE.
APPLICATION FILED JAN. 5, 1906.
911,911.
Patented Feb. 9, 1909.
14 SHEETS—SHEET 3.
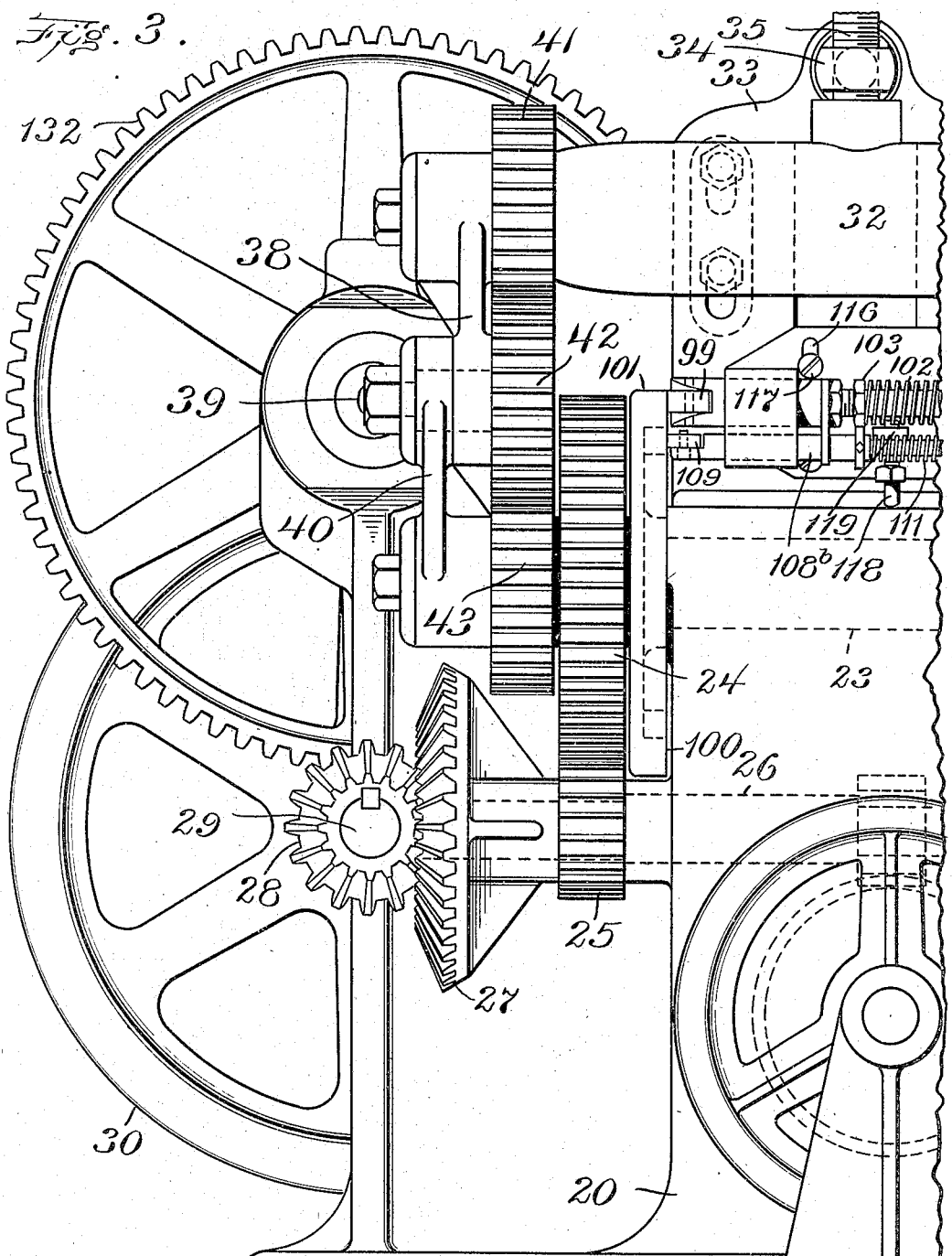

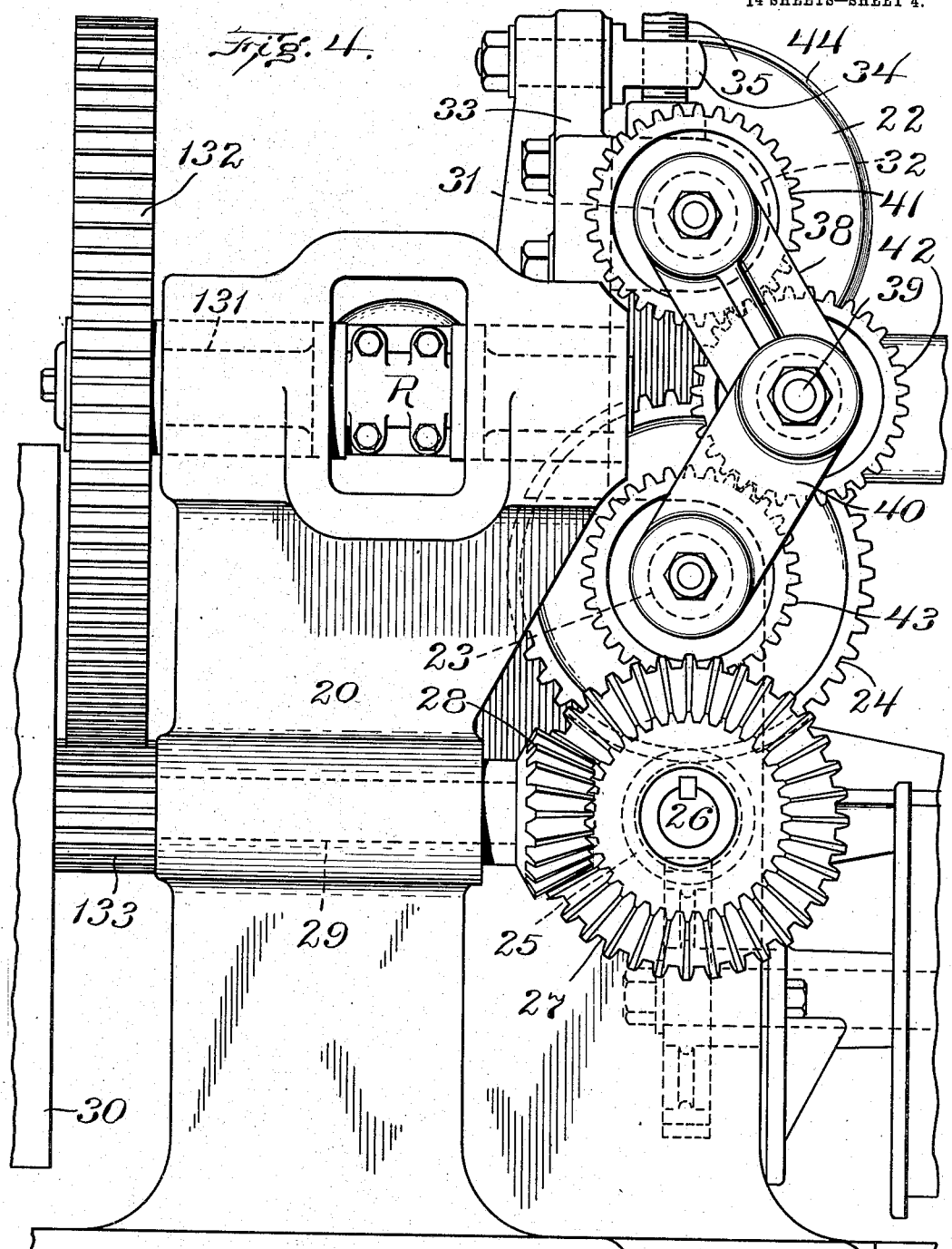

A. T. SISSON.
FORMING MACHINE.
APPLICATION FILED JAN. 5, 1906.
911,911.
Patented Feb. 9, 1909.
14 SHEETS—SHEET 5.
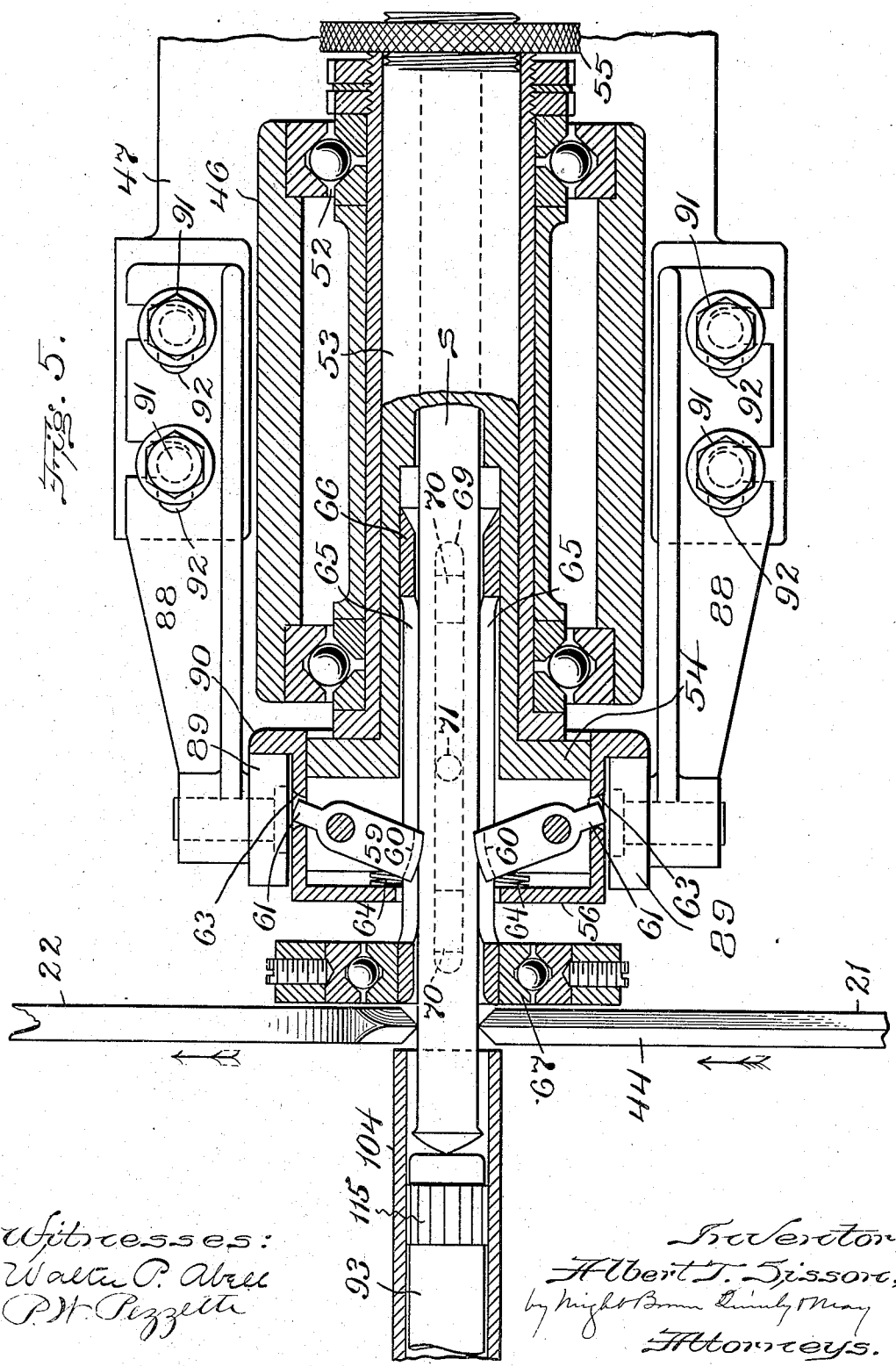

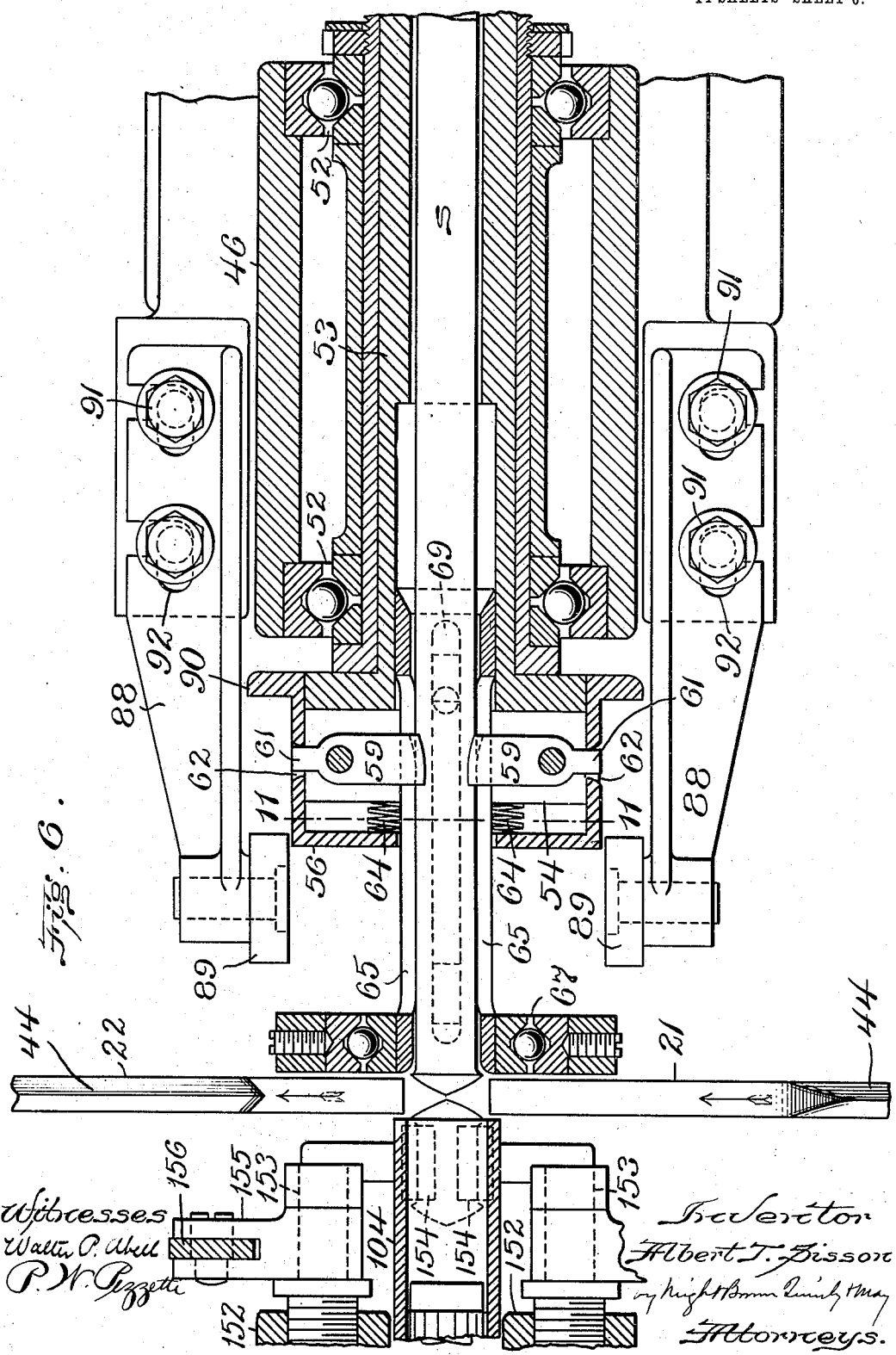

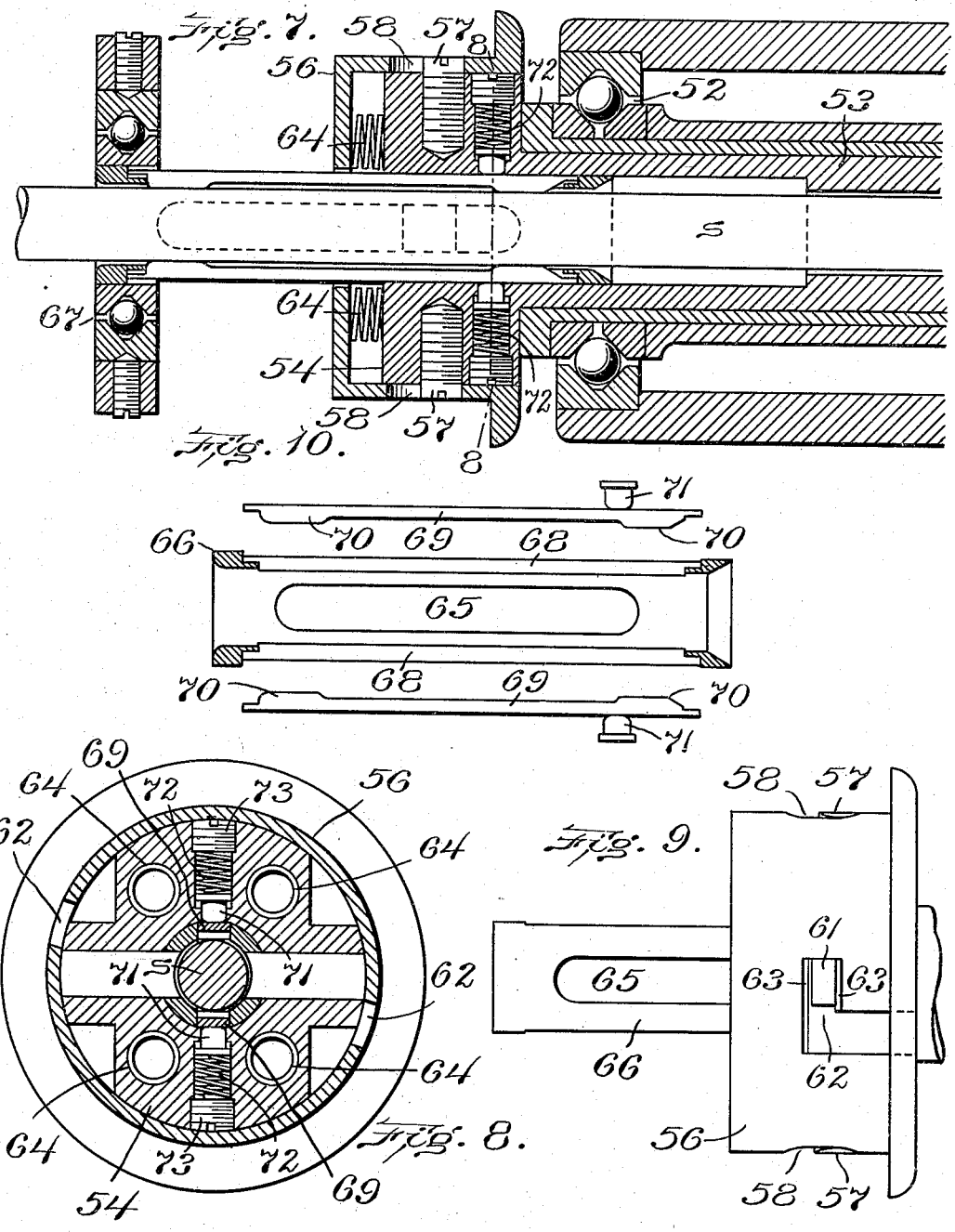

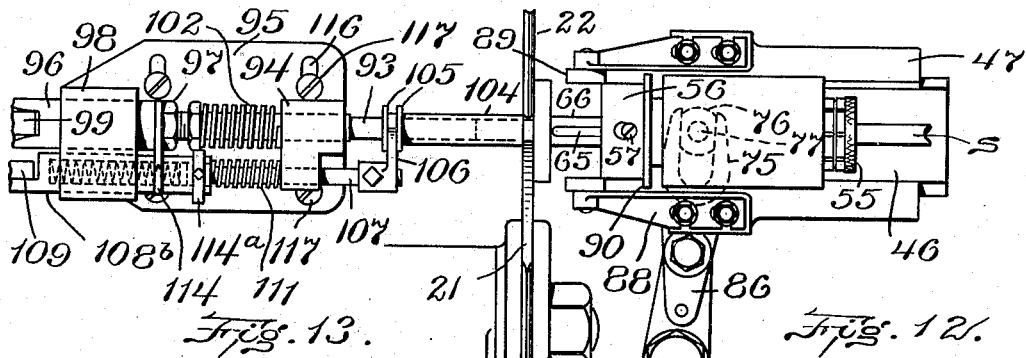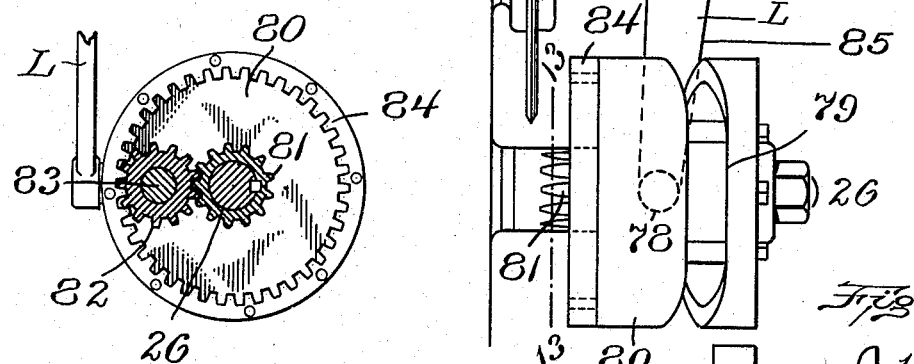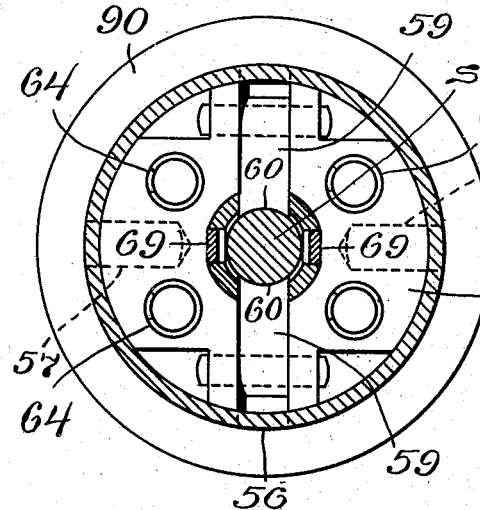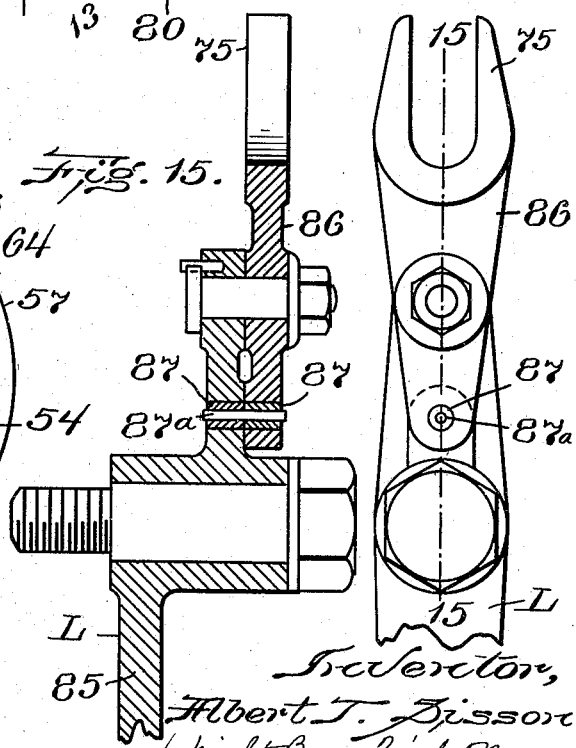

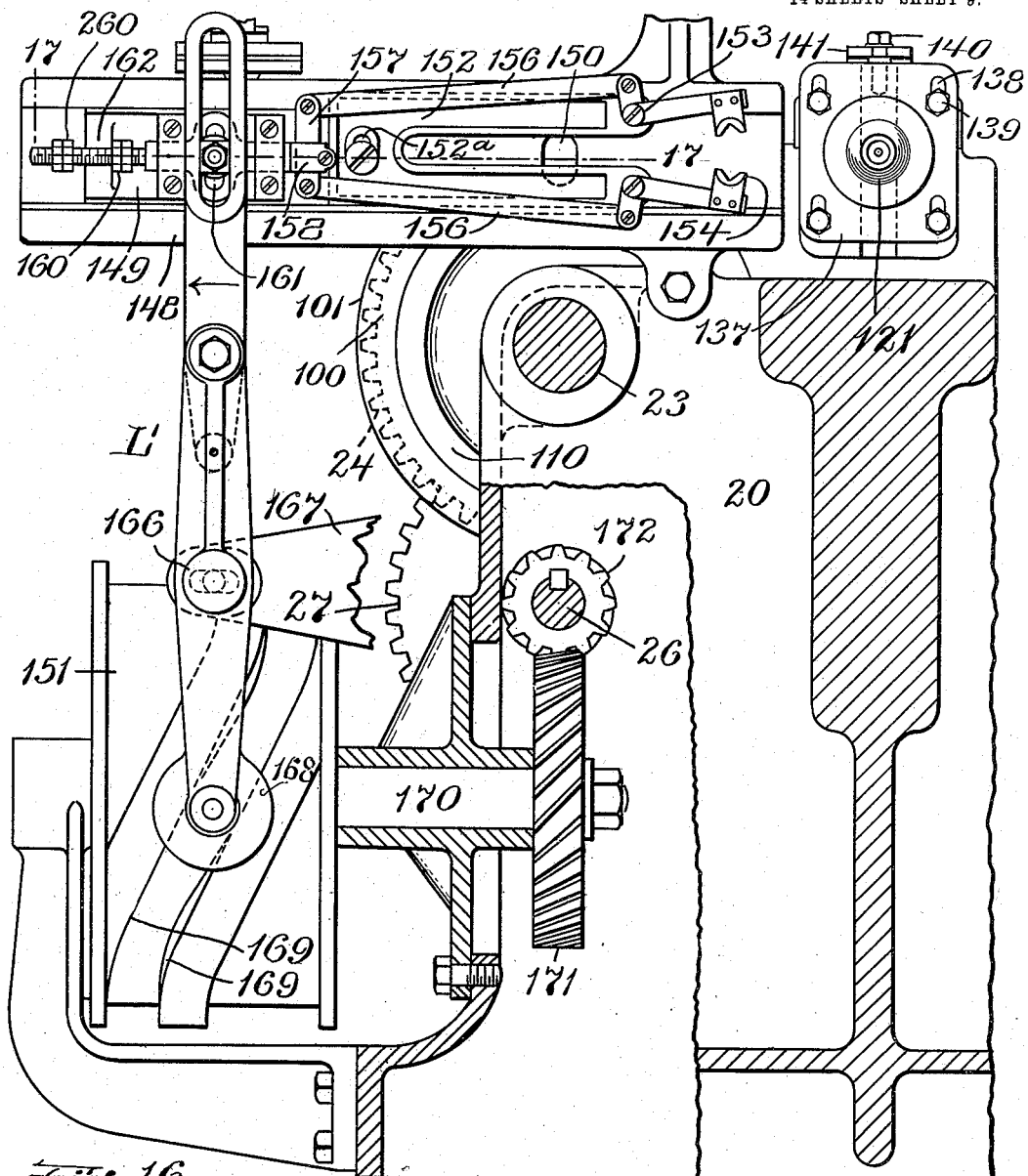

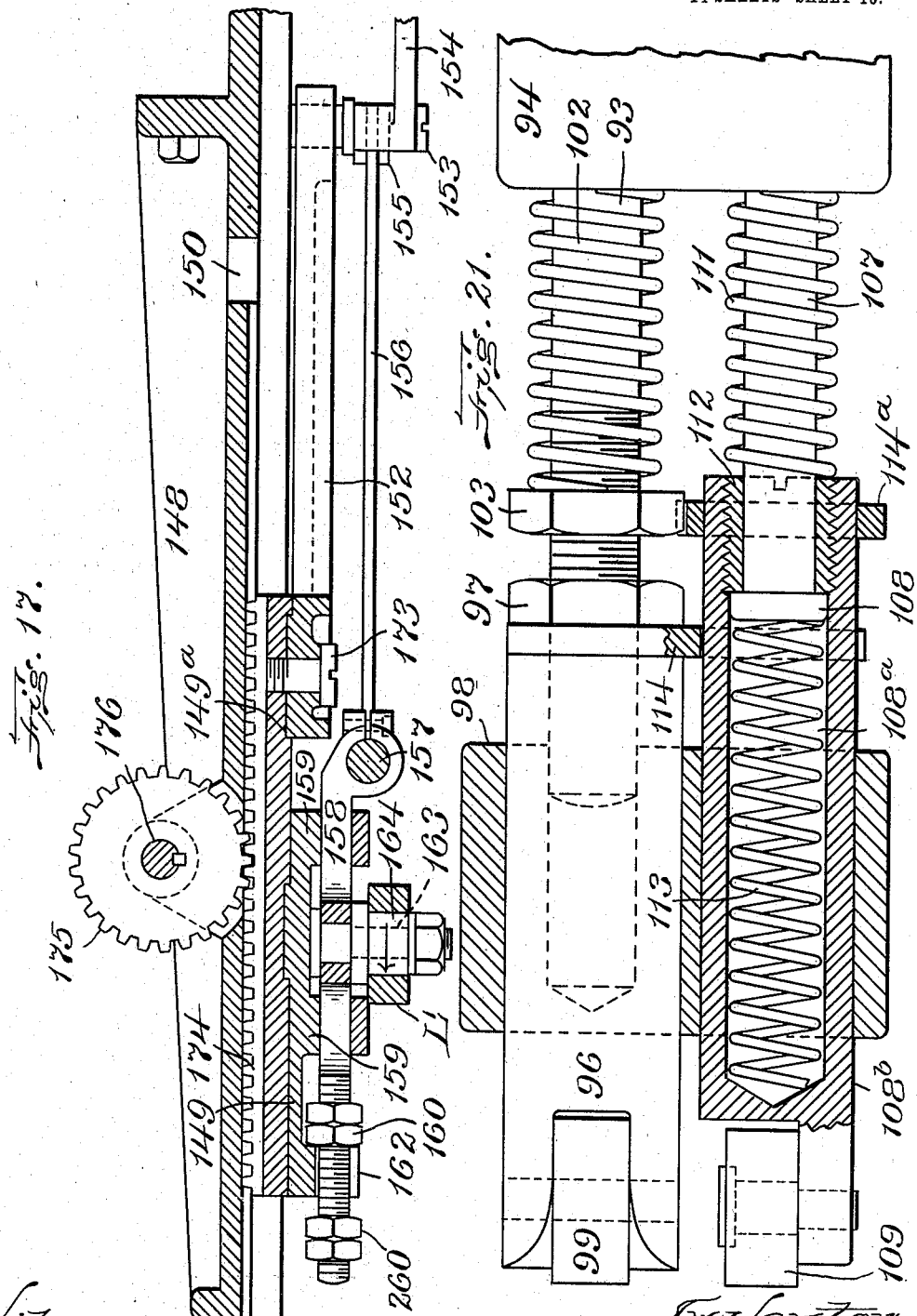

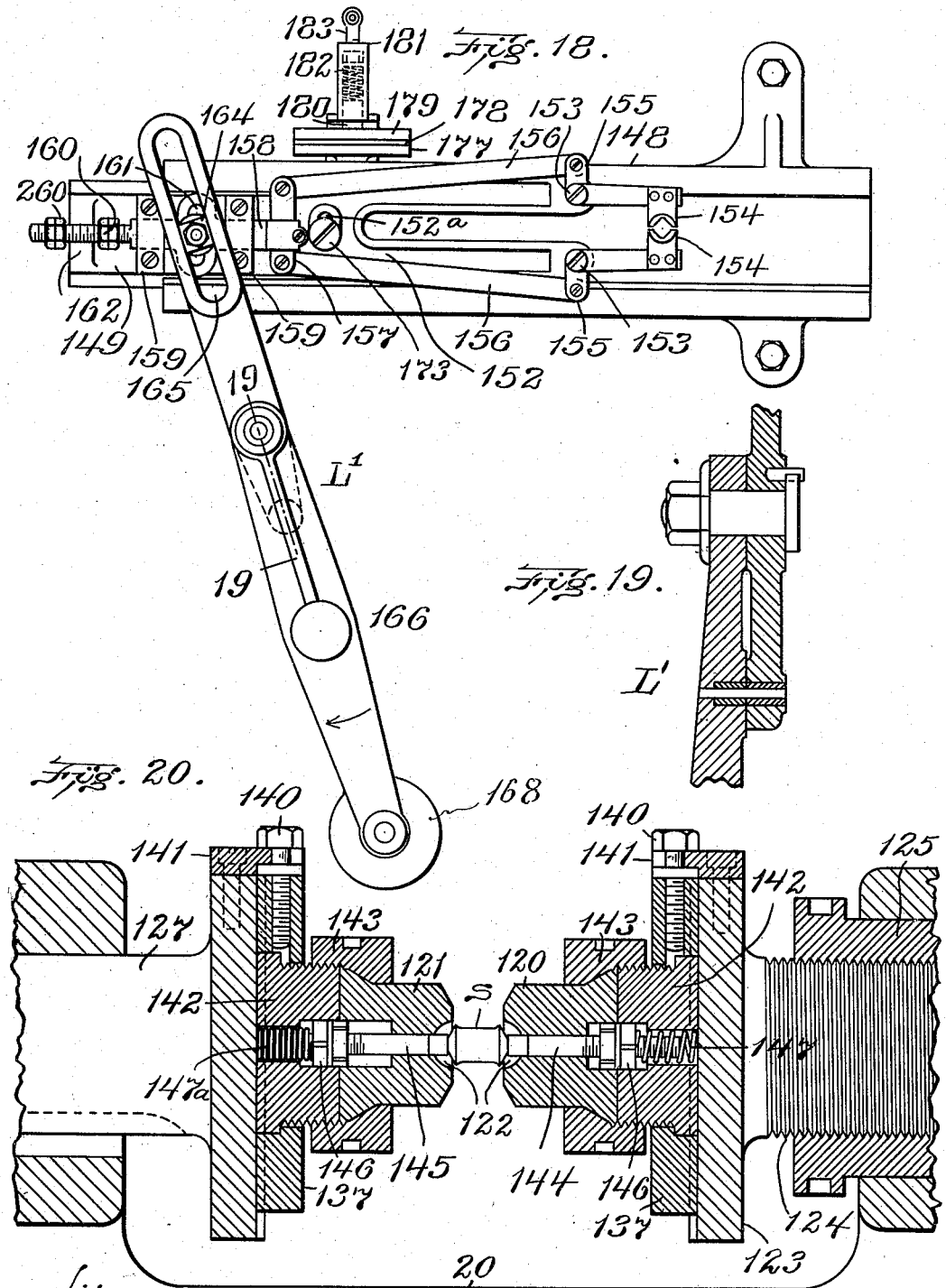

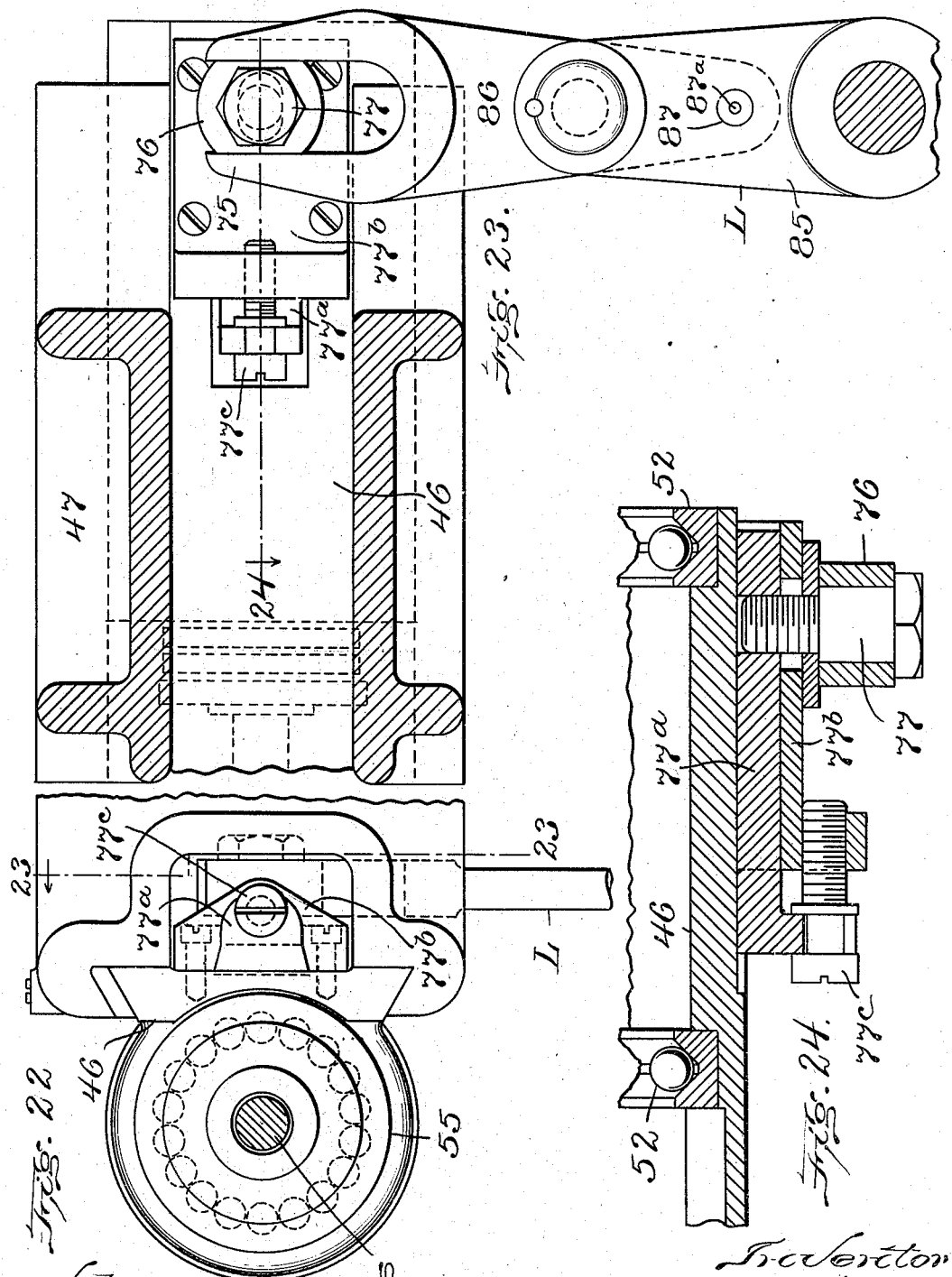

A. T. SISSON.
FORMING MACHINE.
APPLICATION FILED JAN. 5, 1906.
911,911. Patented Feb. 9, 1909.
14 SHEETS—SHEET 13.
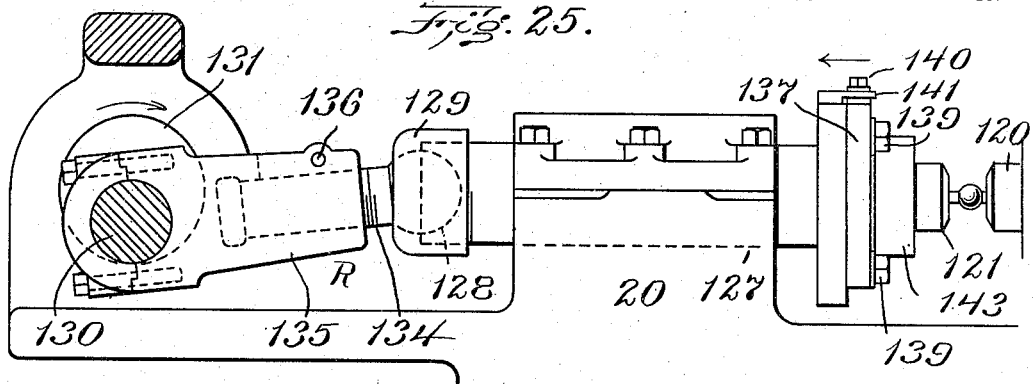
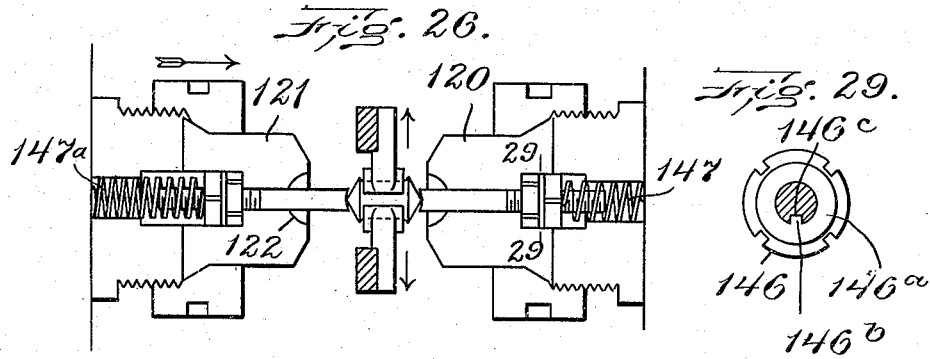
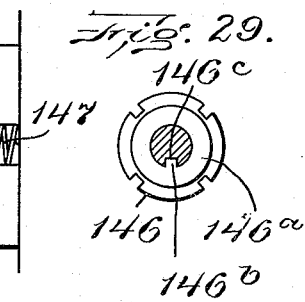
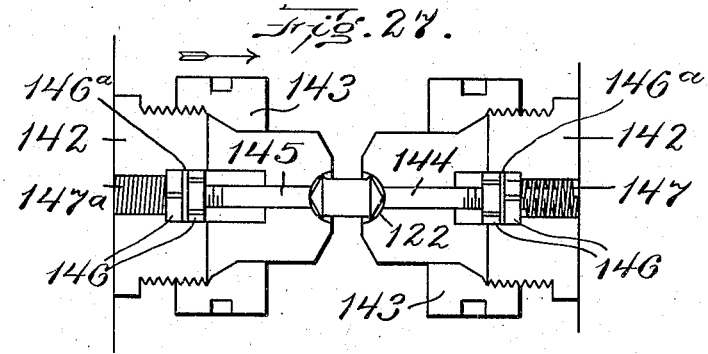
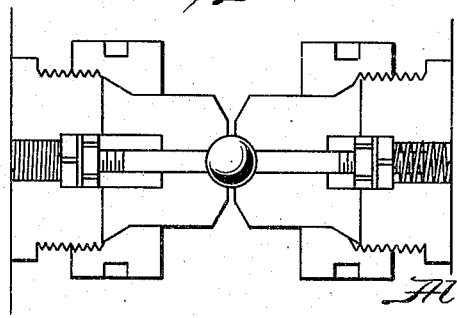
Witnesses:
Walter P. Abell
P. W. Pezzetti
Inventor,
Albert T. Sisson
by Wright Brown Quinby & May
Attorneys.

A. T. SISSON.
FORMING MACHINE.
APPLICATION FILED JAN. 5, 1906.
911,911.
Patented Feb. 9, 1909.
14 SHEETS—SHEET 14.
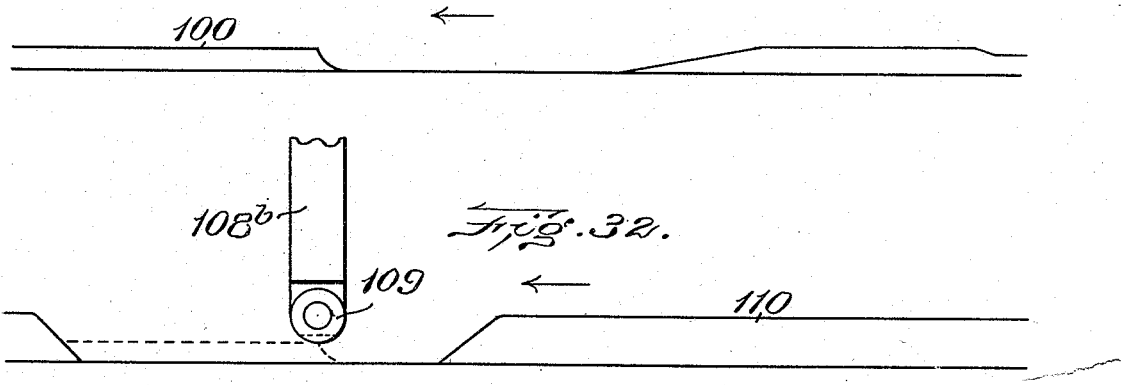
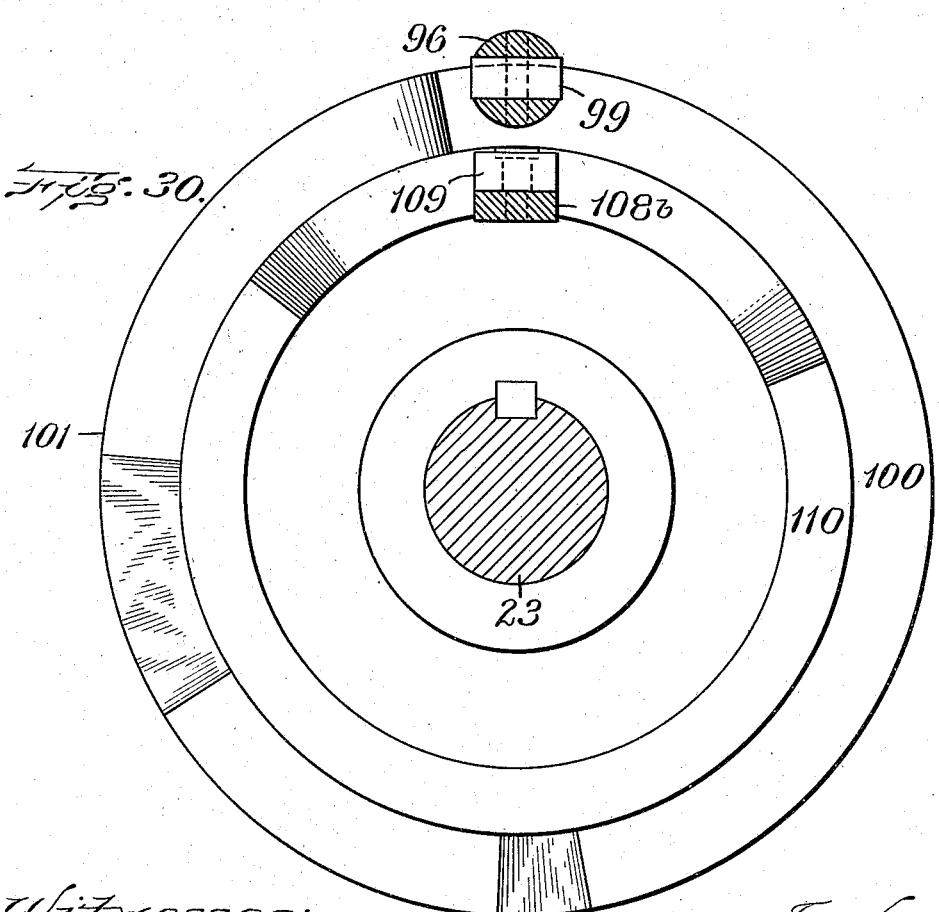

UNITED STATES PATENT OFFICE.

ALBERT T. SISSON, OF PROVIDENCE, RHODE ISLAND, ASSIGNOR, BY MESNE ASSIGNMENTS, TO E. J. JONES COMPANY, OF BOSTON, MASSACHUSETTS, A CORPORATION OF MASSACHUSETTS.

FORMING-MACHINE.

No. 911,911.  Specification of Letters Patent.  Patented Feb. 9, 1909.

Application filed January 5, 1906. Serial No. 294,708.

*To all whom it may concern:*

Be it known that I, ALBERT T. SISSON, of Providence, in the county of Providence and State of Rhode Island, have invented certain new and useful Improvements in Forming-Machines, of which the following is a specification.

My invention relates to machines for forming metal, and more particularly to those for producing ball blanks, such as are described in Patent No. 801267, of October 10, 1905, to Marcellus Reid. Its principal objects are to adapt a machine of this character to operate upon stock fed horizontally and to generally simplify and improve its construction.

Figure 1:
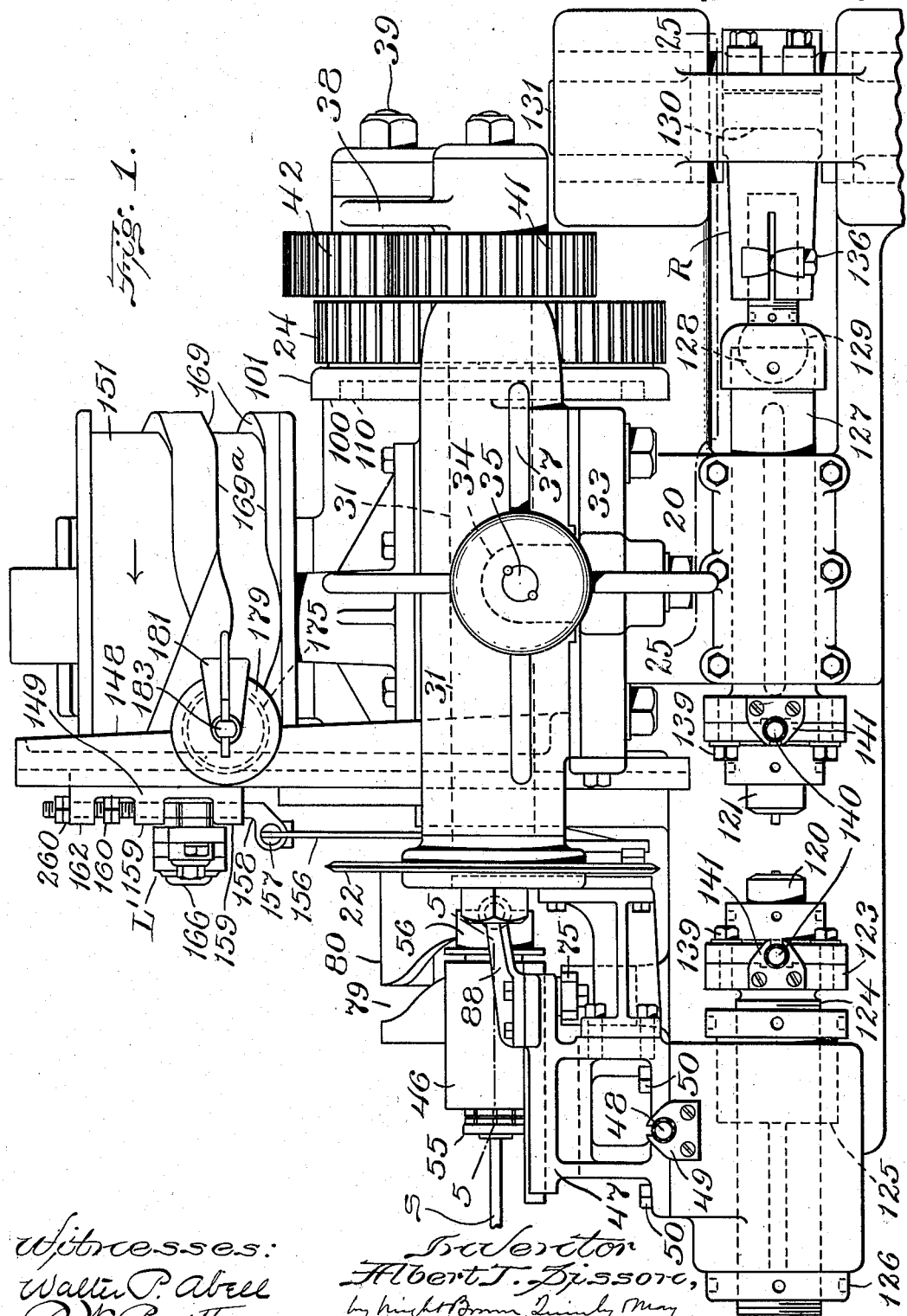
Figure 2:
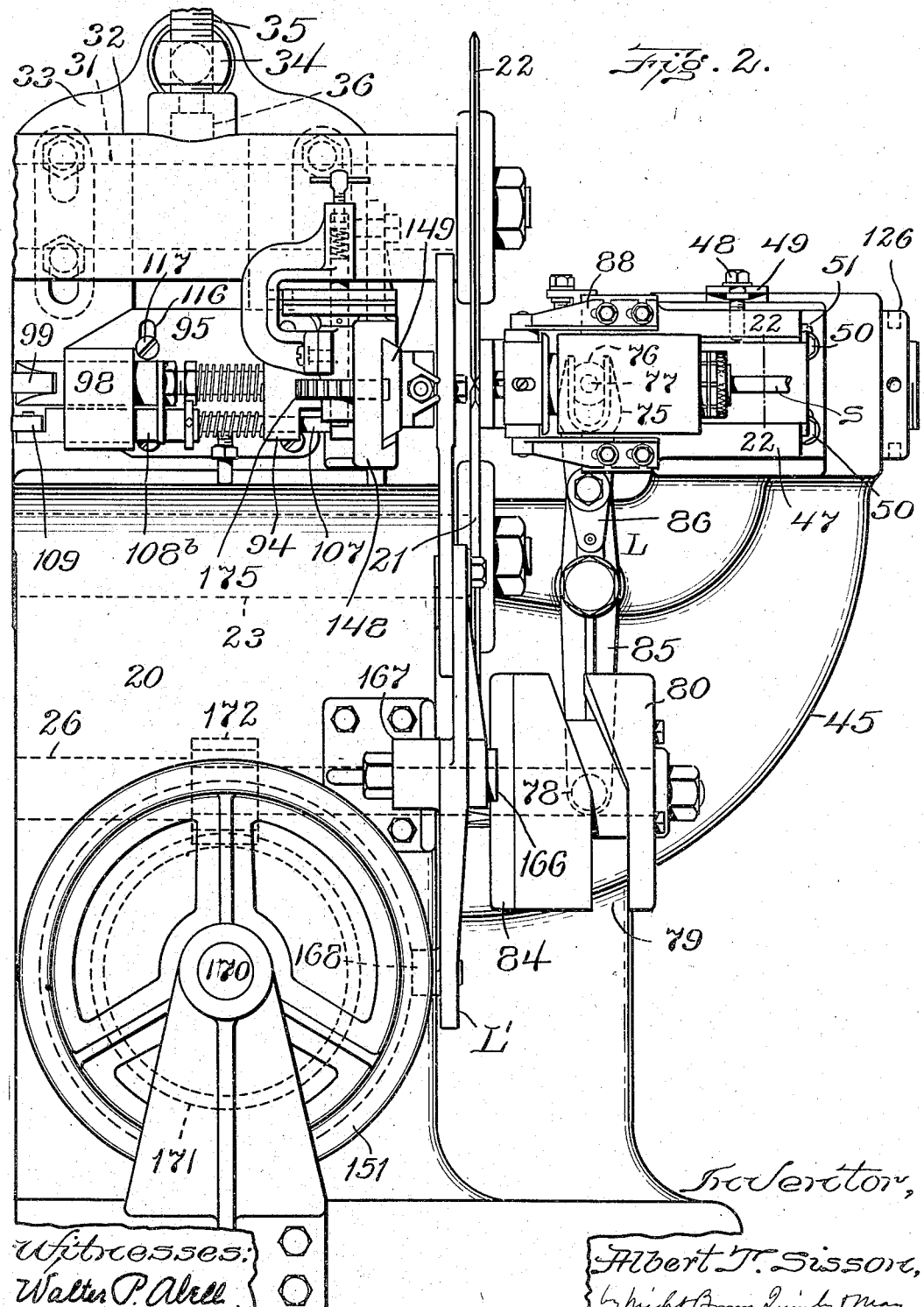

In the accompanying drawings, in which similar characters designate like parts throughout the several views,—Figure 1 is a top plan view of one embodiment of my invention; Figs. 2 and 3 are side elevations thereof, looking toward the rear of Fig. 1 and showing, respectively, the right and left hand portions thereof; Fig. 4 is an end elevation, looking from the right in Fig. 1; Figs. 5 and 6 are enlarged vertical sections on the line 5—5 of Fig. 1, showing successive positions of the elements; Fig. 7 is a similar view, taken in a plane at right angles to Figs. 5 and 6; Fig. 8 is a full transverse section on the line 8—8 of Fig. 7; Fig. 9 is a detail in top plan of the casing at the end of the feeding sleeve; Fig. 10 shows in longitudinal section the feeding guide sleeve, with its retaining members separated from it; Fig. 11 is a transverse section on the line 11—11 of Fig. 6; Fig. 12 is a detail in side elevation of the feeding and gage mechanism; Fig. 13 is a sectional detail on the line 13—13 of Fig. 12; Fig. 14 is a detail in elevation of the driving-lever for the feeding mechanism; Fig. 15 is a vertical section therethrough on the line 15—15 of Fig. 14; Fig. 16 shows in side elevation the conveying mechanism and one of the dies, parts being in section; Fig. 17 is an enlarged horizontal section on the line 17—17 of Fig. 16; Fig. 18 illustrates another position of the conveying mechanism; Fig. 19 is a sectional detail on the line 19—19 of Fig. 18; Fig. 20 is a vertical sectional detail through the dies and more closely associated elements. Fig. 21 is an enlarged sectional detail through the gage and guide mechanism; Fig. 22 is an enlarged sectional detail upon the line 22—22 of Fig. 2; Fig. 23 is a longitudinal section on the line 23—23 of Fig. 22; Fig. 24 is a broken sectional detail upon the line 24—24 on Fig. 23; Fig. 25 is a vertical sectional detail upon the line 25—25 of Fig. 1; Figs. 26 to 28, inclusive, illustrate successive positions of the dies and more closely associated elements; and Fig. 29 is a transverse sectional detail upon the line 29—29 of Fig. 26. Figs. 30, 31, and 32 illustrate somewhat diagrammatically the plungers and cams which coöperate therewith to position and hold the work with relation to the cutters.

In the frame 20 are mounted lower and upper cutters 21 and 22, respectively, (Figs. 1 to 4). The former is secured upon a shaft 23 rotatable in fixed bearings in the frame. At one extremity of this shaft is a gear 24 meshing with a pinion 25 upon a shaft 26 rotatable in the frame, and having fast upon it a bevel-gear 27 coöperating with a bevel-pinion 28 upon a driving-shaft 29, which may be rotated through a pulley 30 and any convenient source of power. The upper cutter 22 is attached to a shaft 31, preferably adjustably mounted to permit the proper relation of the cutters to be maintained as they become reduced in use. This mounting may consist of a bearing-block 32 movable upon a vertical extension 33 from the frame, said extension carrying a threaded lug 34 to receive a screw 35, a head 36 of which is rotatable in the bearing-block. Upon the upper end of the screw is fixed a hand-wheel 37, or the like, by which it may be rotated to raise and lower the bearing-block. The shaft 31 is connected by an arm 38 to a stud 39 fixed to an arm 40, which may turn about the shaft 23. Fast upon the shaft 31 is a gear 41 meshing with an idler 42, rotatable on the stud, which in turn coöperates with a gear 43 secured upon the shaft 23. This connection between the fixed cutter shaft and the movable shaft permits the vertical adjustment of the latter without interference with its rotation. The cutters may be of discoidal form, preferably having beveled cutting edges 44, a portion of which are eccentric to the disks and which have spaces between their ends, as is fully set forth in the above-mentioned patent.

Mounted upon an arm 45 from the frame is mechanism for feeding stock to the cutters, this being more particularly illustrated in Figs. 1, 2, 5, and 12 of the drawings. It may comprise a support 46 movable in ways in a frame 47, adjustable to compensate for the change in position of the edges of the cutters by a screw 48 rotatable in a lug 49 upon the main frame and threaded into the frame 47. The position of the latter elements may be fixed by screws 50 engaging the main frame and extending through vertical slots 51 in the adjustable frame. In the support 46 are situated bearings 52 for a feeding sleeve 53 having a head 54 contacting with the bearings at one end and a nut 55 retaining it against movement at the opposite end. Carried by the head is a hollow cylindrical casing 56, attached to the head, so that it may move longitudinally thereon, by screws 57 projecting from the head into elongated slots 58 in the casing. Fulcrumed in recesses in the head are gripping levers 59, 59, having reduced edges 60 for contact with the stock, these edges being eccentric through radii increasing in the direction of feed. At the opposite ends the levers have reduced ends 61 extending into slots 62 in the casing for contact with inclined walls 63, 63, at each side thereof. Springs 64 are pressed between the head of the casing and that of the feeding sleeve, and serve to force said casing normally outward, tending to swing the gripping levers into engagement with the stock or rod.

The edges 60 of the levers project through opposite slots 65 in a guide sleeve 66 which extends into the feeding sleeve, it having a bearing therein, while at its other end it is rotatable in a relatively fixed bearing 67. Between the slots 65, about 90° therefrom, are slots 68 for the reception of retaining bars 69, which are provided near their opposite ends with contact projections 70 for engaging the stock. This engagement tends to prevent movement of the stock, and is effected by plungers 71 operating in bores at the outer side of the head 54, their inner ends resting against the retaining parts, into contact with which they are forced by springs 72 abutting at their opposite extremities against screws 73, closing the bores.

The support 46 and the elements carried thereby, as here illustrated, are reciprocated or driven by a lever L (Figs. 2, 12, 15, 22, 23 and 24) fulcrumed upon the main frame and having a fork 75 in which slides a block 76. This block is mounted to oscillate upon a pin 77 projecting from a slide 77$^a$, which is shown as movable between the support and a retaining member 77$^b$ fixed to the support and straddling the slide. Rotatable in the slide is a screw 77$^c$ threaded into the retaining member and serving to adjust its position upon the support. By this means the termination of the stroke upon the support may be adjusted with relation to the co-operating elements. At the lower end of the lever is a projection 78 entering a cam-path 79 in a cylinder 80. This cylinder is rotatable about the shaft 26 and is connected to turn at a reduced speed by a pinion 81 (Fig. 13) keyed to the shaft and meshing with an idler 82 carried by a stud 83 fixed to the frame, said idler meshing with an internal gear 84 about the cylinder.

To provide for a connection which may be readily severed in case of any exigency tending to choke or stop the action of the feeding mechanism, and thus prevent the breakage thereof, the lever L is formed in two sections (Figs. 14 and 15), the lower of which is fulcrumed upon the frame, while the upper section 86 carries the fork 75. In the adjacent overlapping arms of these lever sections are alined openings in which are inserted hardened bushings 87 to receive a safety, or readily divisible, pin 87$^a$. When any undue strain is put upon the lever this pin will be sheared off by the bushings throwing the feeding mechanism out of connection and allowing it to be cleared before operation is resumed.

Situated above and below the support 46 are shown arms 88 carrying contact members 89 lying in the path of a flange 90 on the casing. These contact members arrest the movement of the casing, causing the springs 64 to yield, and, as the feeding head continues in motion, the gripping levers are swung upon their fulcra by the approaching walls 63 of the slots 62, so that the engaging edges of the levers are moved upwardly out of coöperation with the stock. To allow a varying in the time of release the arms 88 are preferably attached to the frame by screws 91 passing through L slots in the arms, the horizontal portions 92 of these slots giving an adjustment of the contact members toward and from the feeding head.

As the support 46 is moved outwardly by the driving lever, the outer walls of the slots in the casing contact with the gripping levers, and, the spring 64 resisting movement of the casing, this brings the engaging edges into coaction with a rod or piece of stock S, projecting in a horizontal direction through the feeding-sleeve into the guide sleeve and which is to be operated upon. The eccentricity of the engaging edges is such that any tendency of the stock to withdraw from them causes them to bite more firmly into it. The continued travel of the support advances the stock into the space between the edges of the cutters, this continuing until the flange of the casing contacts with the members 89. The resultant upward movement of the engaging edges previously described frees the stock, permitting it to be pushed back by the gage-rod 93 regulating the length of the slug.

Adjacent to the opposite side of the cutters from the guide sleeve 66 and in alinement with it is a gage-rod 93 (Figs. 2, 3, 5, 6, 12, and 21) mounted to reciprocate in a bracket 94 carried by a plate 95 supported upon the frame. The rod at its upper end is threaded into a plunger 96, the connection between the two and the position of the gage-rod with relation to the end of the stock thus being capable of adjustment. The rod is fixed against accidental movement by a nut 97, the plunger slides through a bracket 98 projecting from the plate and has at its outer extremity a roll 99 for contact with a cam-face 100 extending about the outer portion of the face of a disk 101 fast upon the shaft 23. A spring 102 is interposed between the bracket 94 and a nut 103 on the plunger, exerting its tension to maintain the contact of the roll and cam-face, the latter thus causing the gage-rod to be reciprocated toward and from the cutters. The feed of stock by the mechanism heretofore described, is preferably somewhat in excess of the proper amount, to insure a sufficient length being projected. The movement of the gage-rod serves to return the stock to the correct position, while the members 68 within the guide sleeve 66 retain the stock in the exact position to which it is thus readjusted.

It will be understood that the feed mechanism described is adapted to yieldably feed the stock in one direction, and that the gage rod 93 is freely movable in a direction opposite to the direction of feed of the stock. In other words the gage is freely movable by the cam face 100 because there is nothing to oppose movement toward the stock other than the spring 102. The degree of movement which is given to the gage in a direction opposite to the direction of feed of the stock is controlled by the said cam face 100, said cam face constituting, in this embodiment of the invention, automatic means which will intermittently move the gage toward the stock.

Surrounding the gage-rod and having its end in proximity to the meeting point of the cutters is a receiving guide sleeve 104, which is shown as provided near its outer extremity with flanges 105, 105, forming a way to receive an arm 106 for an operating rod 107 slidable in the bracket 94. At the side of the bracket opposite this guide sleeve the rod 107 preferably has a head 108 movable within a chamber 108$^a$ in a rod section 108$^b$, the exterior of which is square and passes through a similar opening in the bracket 98 in which it is free to slide. The rod section 108$^b$ has rotatable upon it a roll 109 for contact with a cam surface 110 projecting from the disk 101 inside the face 100. A spring 111 lying between the bracket 94 and a gland 112 surrounding the operating rod and being threaded into the section 108$^b$, maintains the coöperation of the cam surface and the roll.

Within the chamber 108$^a$, between its inner end and the head upon the rod, is a spring 113 offering such resistance to compression that it will not be affected in the normal operation of the apparatus, thus allowing the rod and its section 108$^b$ to move as a unit. If, however, the guide-tube becomes clogged or jammed in any manner, this spring will yield, permitting the chambered section to be moved over the rod by the cam, without danger of breaking any of the parts, thus continuing until all obstruction has been removed. Fixed to this section 108$^b$, is shown a collar 114$^a$, which as will be hereinafter described, may at times contact with the fork 114, compelling the gage-rod and guide-tube to move together.

To furnish a suitable bearing for the guide-sleeve 104 upon the gage-rod, upon which it depends for support, a series of rolls 115 may be carried by the sleeve. The reciprocation of the receiving sleeve by its cam-face advances it into proximity to the cutters to support the severed piece of stock, and then withdraws it to allow the removal of said piece.

The proper alinement of the gage-rod and receiving-tube with the edges of the cutters, as these are lowered, may be provided for by fixing the supporting plate 95 to the main frame by screws 116 extending through slots 117 in the plate. These screws serve to clamp the plate in one position or another, to which it may be moved by a screw 118 threaded through a lug 119 upon the plate and resting at its lower extremity against a horizontal surface upon the main frame.

At one side of and in the same horizontal plane as the coöperating edges of the cutters are opposed dies 120 and 121 (Figs. 1, 16, 20, and 25 to 28, inclusive). In the dies are depressions 122 meeting to furnish a cavity having the form of the object to be produced. The die 120 is fixed during the operation of the machine, but may be adjusted toward and from its companion by its support 123, which has a threaded stem 124 engaging an internally threaded sleeve 125. This sleeve is mounted in a bore in the frame and is rotatable, the stem and wall of the bore preferably having a coacting spline and groove to prevent the former from turning. The parts may be locked in their adjusted position by a nut 126 carried by the stem and contacting with the frame. The support of the die 121 has a smooth stem 127 operating in a bore in the frame and being splined thereto. This stem is reciprocated to move the die from its companion by means of a connecting-rod R, having a spherical head 128 entering a socket 129 in the stem. The connecting-rod near its outer extremity is connected to a crank-pin 130 upon a shaft 131 rotatable in the frame and having a gear 132 meshing with a pinion 130

133 fixed to the shaft 29. To vary the terminal point of the stroke of the movable die the connecting-rod is preferably formed with a threaded section 134 carrying the spherical head and entering a tubular section 135, in which it may be clamped by a screw 136, which serves to draw split portions against the screw.

Upon the inner face of each die support is a plate 137 provided with vertical slots 138 to receive screws 139 threaded into the support and which may be used to fix the plates in position. When the screws are loosened the plates may be raised or lowered to compensate for the change in position of the cutting edges, by means of screws 140 rotatable in brackets 141 projecting from the tops of the supports and engaging threads in the plates. Secured between each plate and the support, is a block 142 threaded to receive a collar 143 surrounding the die and operating to hold said die upon the block. Each die and block is preferably provided with alined recesses, in which are situated receiving and ejecting plungers or pins 144 and 145, in the dies 120 and 121, respectively, which project through openings in the die-depressions. Each pin is shown as threaded to receive pairs of nuts 146 146, furnishing a head, and each pair of nuts may be locked in position on the pin by contacting with an intermediate washer 146ᵃ maintained against rotation upon the pin by a projection 146ᵇ entering a slot 146ᶜ extending longitudinally of said pin. The recesses in the die-blocks and dies are of different depths, that of the die 121 and its block being deeper than that of its companion. The pins 144 and 145 are of different lengths from the nuts 146 outwardly, so that when the nuts are in contact with the ends of the die recesses, the pin 145 projects farther through the die toward its companion than the pin 144. Situated between the nuts and the inner walls of the recesses, are springs 147 and 147ᵃ, surrounding the pins 144 and 145, respectively. These springs are preferably formed from wire of the same gage, and have convolutions of the same diameter; but the first-named is of less length, and is therefore less sensitive to compression than the spring 147ᵃ. The end of each pin preferably has a conical recess to receive the end of the piece severed by the cutters.

To convey the severed piece from the cutters to the dies, I provide mechanism shown in Figs 1 and 2, and more in detail in Figs. 6, 16, 17, and 18. Said conveying mechanism is supported by and horizontally movable in suitable guides of a supporting arm 148. The arm 148 extends in a plane transverse to that of the movement of the work-feeding mechanism and of the forming die 121, and is provided with an opening 150, through which the receiving sleeve 104 projects to receive the end of the blank from which the pieces are severed.

The conveying mechanism comprises primarily a support or carriage 149 movable in the aforementioned guides, a driving lever L' connected thereto, and a cylinder-cam 151 for operating said lever. The support 149 has an extension 152, which is forked and adapted to straddle the receiving sleeve 104, and which carries the studs 153, upon which are pivoted a pair of co-acting jaws 154 154, adapted to grasp and hold between them each piece of work which is severed by the cutters. Said jaws have bell-crank arms 155, which are connected to a member 157 by means of pivoted links 156 156. The connecting member 157 is clamped in one end of an operating member 158, and is adjustable to compensate for adjustment of the extension 152, as hereinafter described. The member 158 is supported in lugs 159 upon the movable support 149, and is movable relatively thereto in a direction parallel to the movement of the support itself. This relative movement of the member 158 is limited by adjusting-nuts 160 260 threaded on the outer end thereof at a suitable distance apart, and adapted to abut against opposite sides of a lug 162 projecting from the support 149 into the space between said nuts. The member 158 has a vertical slot 161 about midway between its ends, in which a stud 163 carrying a swiveled block 164 is adjustably clamped. Said block occupies a radial slot 165 in the upper end of the lever L'. The slots 161 and 165 provide for vertical adjustment of the stud 163, for the purpose of varying the extent of movement imparted to the conveying mechanism by the lever L'. The lever L' is fulcrumed upon a stud 166 adjustably mounted in an arm 167 projecting from the main frame 20, and carries at its lower end a trundle-roll 168, which projects between the parallel cam surfaces 169 169 extending around the periphery of the cylinder 151. The cylinder 151 is affixed upon a shaft 170 extending at right angles to the shaft 26 and in a lower plane relatively thereto. A spiral gear 171 affixed to the shaft 170 intermeshes with and is rotated by a spiral-gear 172 affixed to the shaft 26, at a speed ration equal to that of the internal gear 84 relatively to its driving pinion 81, and to that of the gear 132 relatively to the pinion 133.

The movement of the jaw-operating member 158 relatively to the support 149, and which is gaged by the relative positions of the nuts 160 260, is caused by the initial movement of the lever L' upon each reversal of direction of its oscillation. Therefore, inasmuch as the fulcra 153 of the jaws 154 are immovable relatively to the support 149, the initial movement of the member 158 causes the jaws to open or to close, according to the direction of movement of said member, previous to any movement imparted to the conveying mechanism as a unit.

In Figs. 16 and 18, the lever L' is represented as moving from right to left, as indicated by arrows. In Fig. 16, the jaws are held open by the force which presses the nut 160 against the right-hand side of the lug 162, and thereby moves the conveying parts as a unit. The distance to which the jaws may open is limited by the extent of excess motion of the member 158 permitted by the nuts 160 and 260. In Fig. 18, the lever is represented as having reversed its direction and to have moved the member 158 and the nut 260 nearly as far to the right as the lug 162 permits. The jaws 154 are therefore so nearly closed that if a piece of the work were in position, it would be tightly grasped between them, as shown by dotted lines in Fig. 6. The work therefore acts as a stop for arresting the movement of the member 158 relatively to the support 149, and for causing the whole carriage to move as a unit. In the absence of the work, the nut 260 may engage the left side of the lug 162, and so relieve the jaws of the strain when moving the support 149.

It will be seen by reference to Fig. 1, that the cam surfaces 169 comprise inoperative portions 169ª, between which the roll 168 dwells immovably soon after its direction of movement is reversed. This dwell occurs immediately after the closing of the jaws upon the work, but before movement of the support 149 toward the dies, and causes the jaws to surround the end of the work, and so to relieve the receiving sleeve 104 of that duty during the final stage of the severing operation. After the passage of the inoperative portion of the cam, the conveying mechanism moves as a unit toward the forming dies, and stops when the severed piece is in alinement with the receiving pins 144 and 145, which close upon it immediately. Reverse movement of the lever L' then causes the jaws to separate, and when the nut 160 once more engages the right side of the lug 162, causes the mechanism to return to the cutters.

The part 152, which is hereinbefore referred to as an extension of the support 149, is rigidly clamped against said support, by means of a screw 173. A shoulder 149ª on the support prevents the extension from turning about the screw (see Fig. 17), and a slot 152ª in the extension through which the screw extends permits adjustment of the extension relatively to the support. Adjustment of the extension 152 is adapted to compensate for adjustments of the other elements of the machine due to the wearing away of the cutters. For the same reason, the opening 150 in the arm 148 is elongated.

In order to retard the movement of the support 149 at the completion of each stroke, and so to prevent excess movement thereof relatively to that of the member 158, which would otherwise be caused by momentum to close or open the jaws prematurely, a suitable device is attached to the back side of the arm 148, and connected to the support. Upon the inner side of the support is a rack 174, with which coöperates a pinion 175 secured upon a shaft 176 journaled upon the rear of the arm 148. The upper end of the shaft carries a disk 177, upon which rests a friction member 178, conveniently of leather, and having contacting with its upper face a disk 179 fast upon a stem 180 movable endwise in a bracket 181. A spring 182 situated in a chamber in the bracket contacts with the shaft 180, and with a screw 183, by which the pressure of the disk upon the friction member may be varied. This is adjusted until a suitable resistance is offered to the travel of the support, thus preventing movement beyond the point at which the driving lever ceases to act, without introducing an unnecessary drag.

The general operation of the machine is as follows: A rod of the material to be operated upon being within the feeding and the guide sleeves, it is gripped and advanced through the space between the cutting edges into the receiving sleeve to a distance slightly in excess of that desired. The grip of the feeding mechanism is then released, and the gage-rod forces the stock back between the retaining members to the correct position. Now the edges of the cutters enter the stock and divide it, thus accomplishing the first step in the forming operation. As these cutters are preferably rotatable in the same direction, the stock will be rotated during this operation, but this occurs without strain upon the feeding mechanism, by virtue of the rotation of the support. After the gage-rod has positioned the stock, the receiving tube is withdrawn for a portion of the travel, though still coöperating with the stock, to enable the conveying jaws to close upon the partially severed piece or slug. When this has been accomplished, the collar 114ª contacts with the fork 114, and the cam-face leaves the roll 109. The gage-rod and said tube are both drawn back abruptly and simultaneously by the springs 111 and 102, to fully free the slug, which is now completely severed. The jaws then travel into the path of the dies, delivering the piece between the ends of the pins 144 and 145. The movable die now advances, causing the pins to grasp the piece between them. On account of the greater sensitiveness of the spring 147ª, and as the movement of the die 141 continues, the pin 145 is forced into the recess, while the companion pin remains stationary (Fig. 26). While this is occurring, the conveying jaws separate, and are withdrawn. The extension of the pins is now substantially the same, and as the movable die continues its advance, the springs are compressed at the same rate, since their sensitiveness is now practically equal, causing the adjacent ends of the pins to reach the rear of the die-depressions simultaneously. The nuts are now in contact with the outer walls of the recesses, so that the ends of the pins are held in their proper relation to the die-depressions, furnishing a portion of the walls thereof (Fig. 27). Then the completion of the travel of the die compresses the piece to the desired form (Fig. 28), and upon its reversal, the springs of both pins cause them to eject the completed blank.

Having thus explained the nature of my invention, I claim:

1. A reciprocatory support, a gripping member movable upon the support, an actuating member for the gripping member movable relatively to the support, and a member with which the actuating member may contact, said contact member being fixed and the actuating member movable into coöperation with it.

2. The combination with forming mechanism, of a reciprocatory feeding sleeve having a head situated adjacent to the forming mechanism, a movable gripping member carried by the head, an actuating member encircling the head and overhanging it upon the side toward the forming mechanism, and a spring interposed between the overhanging portion and head.

3. The combination of a reciprocatory support, a gripping member movable upon the support, a fixed member for moving the gripping member in one direction, and a spring for moving it in another direction.

4. The combination of a reciprocatory support, a gripping member movable upon the support, a fixed member for moving the gripping member in one direction, and means whereby the position of said fixed member may be changed.

5. A guide sleeve provided with a circumferential series of slots, a feeding sleeve movable over the guide sleeve, gripping members mounted upon the feeding sleeve and projecting through certain of the slots in the guide sleeve, retaining members operating in other of said slots, and yieldable means for forcing the retaining members through the slots.

6. A guide sleeve provided with a circumferential series of slots, a feeding sleeve movable over the guide sleeve, opposed gripping members mounted upon the feeding sleeve and projecting through two of the slots in the guide sleeve, and retaining members operating in intermediate slots.

7. In a metal working machine, the combination with forming mechanism, of feed mechanism adapted to yieldably feed the stock, a gage freely movable toward and from the stock, and means for controlling the degree of movement in a direction opposite to the direction of feed of the stock.

8. In a metal working machine, the combination with forming mechanism, of feed mechanism adapted to yieldably feed the stock, a movable gage in line with the path of the feed, and automatic mechanism arranged to intermittently move the gage in a direction opposite to the direction of feed.

9. A conveying mechanism comprising a traveling support, jaws movable upon the support, an operating member movable upon the support and being connected to the jaws, and separated contact members carried by the operating members and alternately contacting with the support.

10. The combination of conveying mechanism, comprising a traveling support, jaws movable upon the support, an operating member movable upon the support and being connected to the jaws, coöperating contact members carried by the support and operating member, and means for permitting an adjustment of one of the contact members with respect to the other.

11. The combination of conveying mechanism comprising a traveling support, jaws movable upon the support, an operating member mounted to slide upon the support and having a threaded portion, nuts situated upon the threaded portion for alternate contact with the support during the movement of the operating member, and connections between the operating member and jaws.

12. The combination with forming mechanism, of conveying mechanism comprising an adjustable traveling support provided with an independently movable portion, jaws pivoted upon the movable portion, an operating member for the jaws carried by the support, and adjustable connections between the operating member and jaws, whereby the adjustment of the support may be compensated for.

13. A feeding sleeve, and a guide sleeve situated within the feeding sleeve, and having yieldable sections adapted to contact with the work at a plurality of separated points.

14. A feeding sleeve, and a giude sloove having openings extending longitudinally of the work and being situated within the feeding sleeve, and elongated yieldable sections movable through the openings.

15. A feeding sleeve, a guide sleeve having openings and being situated within the feeding sleeve and being provided with elongated yieldable sections movable through the openings, plungers movable in the feeding sleeve, and contacting with the sections between their extremities, and springs coöperating with the feeding sleeve and pressing upon the plungers.

16. A gage member, a guide member, means for moving one of the members longitudinally with relation to the other, and means carried by said member for compelling the simultaneous movement of the other to free the work.

17. A gage member, a guide member, independent means for moving said members, and means carried by one of the members for causing the other to move with it from the work.

18. The combination with opposed dies, one of which is movable toward the other, of movable receiving members extending through the dies to different distances, and conveying mechanism operating between the receiving members during the movement of the dies.

19. The combination with opposed dies, of movable receiving members carried by the dies, and means for resisting the movement of the receiving members, said means offering different resistances thereto.

20. The combination with opposed dies, of movable receiving members carried by the dies, and springs of different degrees of sensitiveness acting upon the receiving members.

21. The combination with opposed dies, of movable receiving members carried by the dies, and springs of different lengths acting upon the receiving members.

22. The combination with opposed dies, of movable receiving members extending through the dies to different distances, and springs of different degrees of sensitiveness acting upon the receiving members.

23. The combination with a die, of a yieldable pin projecting therethrough, and a head movable upon the pin whereby the projection of said pin may be varied.

24. The combination with a die, of a pin projecting therethrough, and having a threaded portion, a contact nut engaging the thread, and a spring coöperating with the nut and with a relatively fixed point.

25. A traveling support, jaws movable thereon, means operable by the travel of the support for moving the jaws, a rotary friction member rotated by movements of the support, and a non-rotating friction member in contact with said rotary member, for preventing excess of movement of the support.

In testimony whereof I have affixed my signature, in presence of two witnesses.

ALBERT T. SISSON.

Witnesses:
  MARION F. HUGHES,
  WILLIAM T. EYER.